United States Patent
Kawamura

(10) Patent No.: US 9,627,710 B2
(45) Date of Patent: Apr. 18, 2017

(54) BATTERY

(75) Inventor: Hiroshi Kawamura, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 174 days.

(21) Appl. No.: 14/007,202

(22) PCT Filed: Mar. 22, 2012

(86) PCT No.: PCT/JP2012/001979
§ 371 (c)(1),
(2), (4) Date: Sep. 24, 2013

(87) PCT Pub. No.: WO2012/132345
PCT Pub. Date: Oct. 4, 2012

(65) Prior Publication Data
US 2014/0017535 A1    Jan. 16, 2014

(30) Foreign Application Priority Data

Mar. 25, 2011  (JP) .................................. 2011-068800

(51) Int. Cl.
*H01M 10/04*    (2006.01)
*H01M 10/0525*  (2010.01)
*H01M 10/0587*  (2010.01)

(52) U.S. Cl.
CPC ... *H01M 10/0431* (2013.01); *H01M 10/0525* (2013.01); *H01M 10/0587* (2013.01); *Y02P 70/54* (2015.11); *Y10T 29/49108* (2015.01)

(58) Field of Classification Search
CPC ........ Y10T 29/49108; H01M 10/0431; H01M 10/0587; H01M 10/0525; Y02E 60/122

USPC ........................................... 429/94; 29/623.1
See application file for complete search history.

(56) References Cited

U.S. PATENT DOCUMENTS

| 8,129,048 B2 | 3/2012 | Hirakawa et al. |
| 2003/0186113 A1* | 10/2003 | Hashimoto et al. ............ 429/94 |
| 2006/0024571 A1 | 2/2006 | Kim et al. |
| 2006/0063063 A1 | 3/2006 | Mori et al. |
| 2008/0241646 A1 | 10/2008 | Sawa et al. |

(Continued)

FOREIGN PATENT DOCUMENTS

| CN | 1738093 | 2/2006 |
| JP | 10-125347 | 5/1998 |

(Continued)

OTHER PUBLICATIONS

Extended European Search Report dated Aug. 19, 2014 issued in the corresponding European patent application No. 12764560.4.

(Continued)

*Primary Examiner* — Jonathan Jelsma
*Assistant Examiner* — Omar Kekia
(74) *Attorney, Agent, or Firm* — Rankin, Hill & Clark LLP

(57) ABSTRACT

A battery includes: an electricity-generating element that is formed by winding an electrode plate and a separator and has a space at a winding axial portion; and a spacer having an inclined portion having a width that is gradually reduced toward the center of the electricity-generating element. At least a part of the spacer is disposed in the space at the winding axial portion of the electricity-generating element, the inclined portion of the spacer abutting against an end of an inner wall of the electricity-generating element.

5 Claims, 12 Drawing Sheets

(56) References Cited

U.S. PATENT DOCUMENTS

| | | |
|---|---|---|
| 2009/0162748 A1 | 6/2009 | Fan et al. |
| 2011/0020679 A1 | 1/2011 | Kobayashi |
| 2011/0052973 A1 | 3/2011 | Kim |
| 2011/0081565 A1* | 4/2011 | Kang ............................. 429/94 |
| 2011/0117403 A1* | 5/2011 | Hermann ................ H01M 2/00 429/94 |

FOREIGN PATENT DOCUMENTS

| | | |
|---|---|---|
| JP | 11-073998 | 3/1999 |
| JP | 2001-043889 | 2/2001 |
| JP | 2002-222660 | 8/2002 |
| JP | 2003-092148 | 3/2003 |
| JP | 2009-252503 | 10/2009 |
| KR | 20090105544 | 10/2009 |
| WO | 2007/097172 | 8/2007 |

OTHER PUBLICATIONS

International Search Report dated May 29, 2012 filed in PCT/JP2012/001979.
Extended European Search Report dated Oct. 29, 2015 issued in the corresponding European patent application No. 12764560.4.

* cited by examiner

BATTERY

TECHNICAL FIELD

The present invention relates to a battery. In particular, the present invention relates to a battery provided with an electricity-generating element formed by winding an electrode plate and a separator.

BACKGROUND ART

There has been conventionally known a battery provided with an electricity-generating element formed by winding an electrode plate and a separator (see, for example, Patent Document 1).

Patent Document 1 discloses a cylindrical battery provided with an electricity-generating element having an electrode plate and a separator wound around a cylindrical core, a columnar pole to be inserted into the core, and a spacer held between a flange formed at the root of the pole and the end of the core. The spacer is disposed in such a manner as to fill a space in a winding axial direction (i.e., a direction in which the winding axis of the electricity-generating element extends) between the flange and the end of the core. Consequently, the spacer is such configured as to suppress movement of the electricity-generating element in the winding axial direction due to vibrations or impact.

PRIOR ART DOCUMENTS

Patent Documents

Patent Document 1: JP-A-10-125347

SUMMARY OF THE INVENTION

Problems to be Solved by the Invention

However, in the case where there is a gap defined between the outer peripheral surface of a portion to be inserted into the core of the pole and the inner circumferential surface of the core, the battery disclosed in Patent Document 1 cannot suppress movement of the electricity-generating element in a lateral direction perpendicular to the winding axial direction due to vibrations or impact. The inner circumferential surface of the core of the electricity-generating element and the outer peripheral surface of the pole need be fitted to each other without any gap in order to suppress not only the movement of the electricity-generating element in the winding axial direction but also the movement of the electricity-generating element in the lateral direction in the battery having the configuration disclosed in Patent Document 1. However, in this case, the dimensions of the pole and the core need be adjusted with high precision. Moreover, the pole is hardly inserted into the core, thereby possibly raising a problem to be solved that the battery cannot be readily fabricated.

The present invention has been accomplished to solve the above-described problem to be solved. An object of the present invention is to provide a battery that can be readily fabricated and can suppress movement of an electricity-generating element.

Means For Solving the Problems

A battery according to one aspect of the present invention includes: an electricity-generating element that is formed by winding an electrode plate and a separator and has a space at a winding axial portion; and a spacer having an inclined portion having a width that is gradually reduced toward the center of the electricity-generating element; wherein at least a part of the spacer is disposed in the space at the winding axial portion of the electricity-generating element, the inclined portion of the spacer abutting against an end of an inner wall of the electricity-generating element.

As described above, the spacer having the inclined portion whose width is reduced toward the center of the electricity-generating element is disposed in the space of the winding axial portion in the electricity-generating element in such a manner that the inclined portion and the end of the inner wall of the electricity-generating element abut against each other in the battery according to one aspect of the present invention. The spacer is disposed in the space of the winding axial portion like a wedge, and therefore, the inclined portion of the spacer presses the electricity-generating element outward (i.e., laterally) perpendicularly to the winding axial direction, thus fixing the electricity-generating element. Moreover, the use of the spacer having the inclined portion whose width is reduced toward the center of the electricity-generating element enables the spacer to be fitted to the end in the space in the winding axial portion in the electricity-generating element without any gap by adjusting the arrangement and position of the spacer. That is to say, the battery can be readily fabricated without adjusting the width of the space in the winding axial portion and the width of the spacer with high precision.

It is preferable that the battery according to the above-described aspect should further include a battery case housing the electricity-generating element therein, wherein an end opposite to the end of the spacer disposed in the space at the winding axial portion of the electricity-generating element is configured in such a manner as to abut against the battery case or a member fixed to the battery case. With this configuration, it is possible to suppress the spacer from being moved in the winding axial direction of the electricity-generating element, so as to suppress the electricity-generating element from being moved in both the lateral direction and the winding axial direction.

It is preferable that the electrode plate should include a mixture formed portion at which a mixture for a positive electrode or a negative electrode is formed, and a mixture non-formed portion not having the mixture formed thereat, the electricity-generating element having the mixture non-formed portion at the end in the winding axial direction, and the inclined portion of the spacer should abut against the mixture formed portion in the electricity-generating element in the battery according to the above-described aspect. Here, in the case where the mixture non-formed portion is disposed at the end in the winding axial direction, the mixture non-formed portion formed of a thin foil has flexibility even if the spacer presses the mixture non-formed portion, and therefore, the electricity-generating element cannot be satisfactorily fixed. In contrast, according to the present invention, the spacer is inserted into the space in the winding axial portion in the electricity-generating element from the end having the mixture non-formed portion, and further, the inclined portion presses the mixture formed portion. Consequently, the electricity-generating element can be satisfactorily fixed. Moreover, the spacer does not press the mixture non-formed portion, and therefore, the mixture non-formed portion cannot be deformed or broken.

It is preferable that the electricity-generating element should have a flat surface on the inner wall of the winding axial portion; the inclined portion of the spacer should have a flat surface; and the flat surface of the inclined portion should abut against the flat surface on the inner wall of the winding axial portion in the battery according to the above-described aspect. With this configuration, the inclined portion having the flat surface, of the spacer can press the flat surface of the inner wall of the winding axial portion from inside toward outside at a great contact area. In this manner, the configuration in which the flat portion of the inner circumferential surface (i.e., the winding axial portion) of the electricity-generating element is pressed is particularly effective in suppressing the movement of the electricity-generating element inside the battery case in close contact of the electricity-generating element with the battery case.

MODE FOR CARRYING OUT THE INVENTION

Preferred embodiments embodying the present invention will be described below with reference to the attached drawings.

First, referring to FIGS. 1 to 8, a description will be given of the configuration of a battery 100 according to one preferred embodiment of the present invention.

Figure 1:
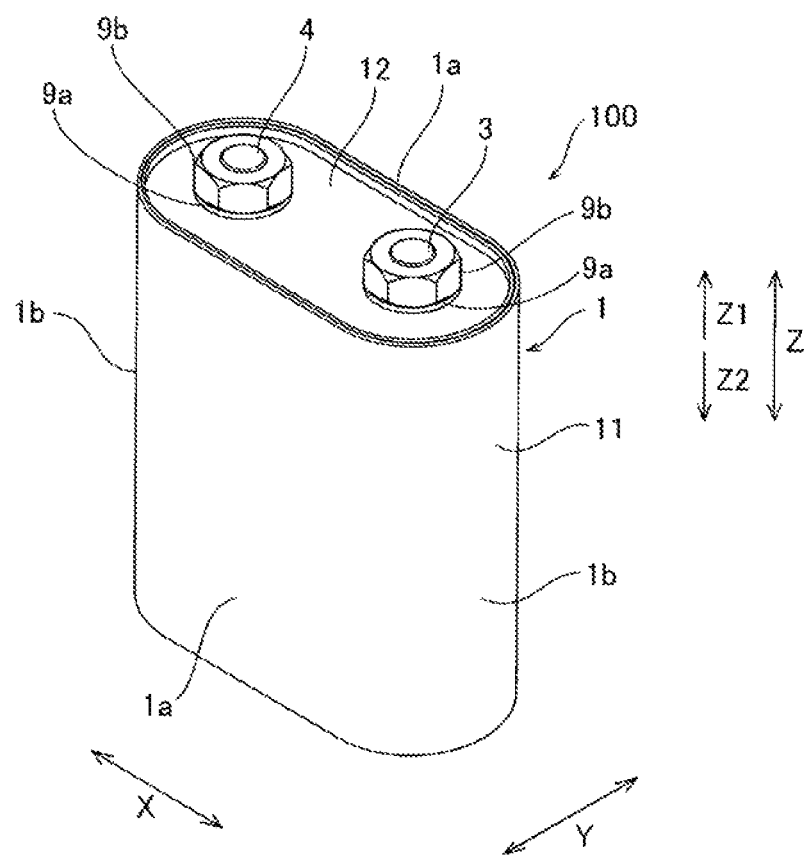
FIG. 1 is an external view showing a battery according to one preferred embodiment of the present invention.
Figure 2:
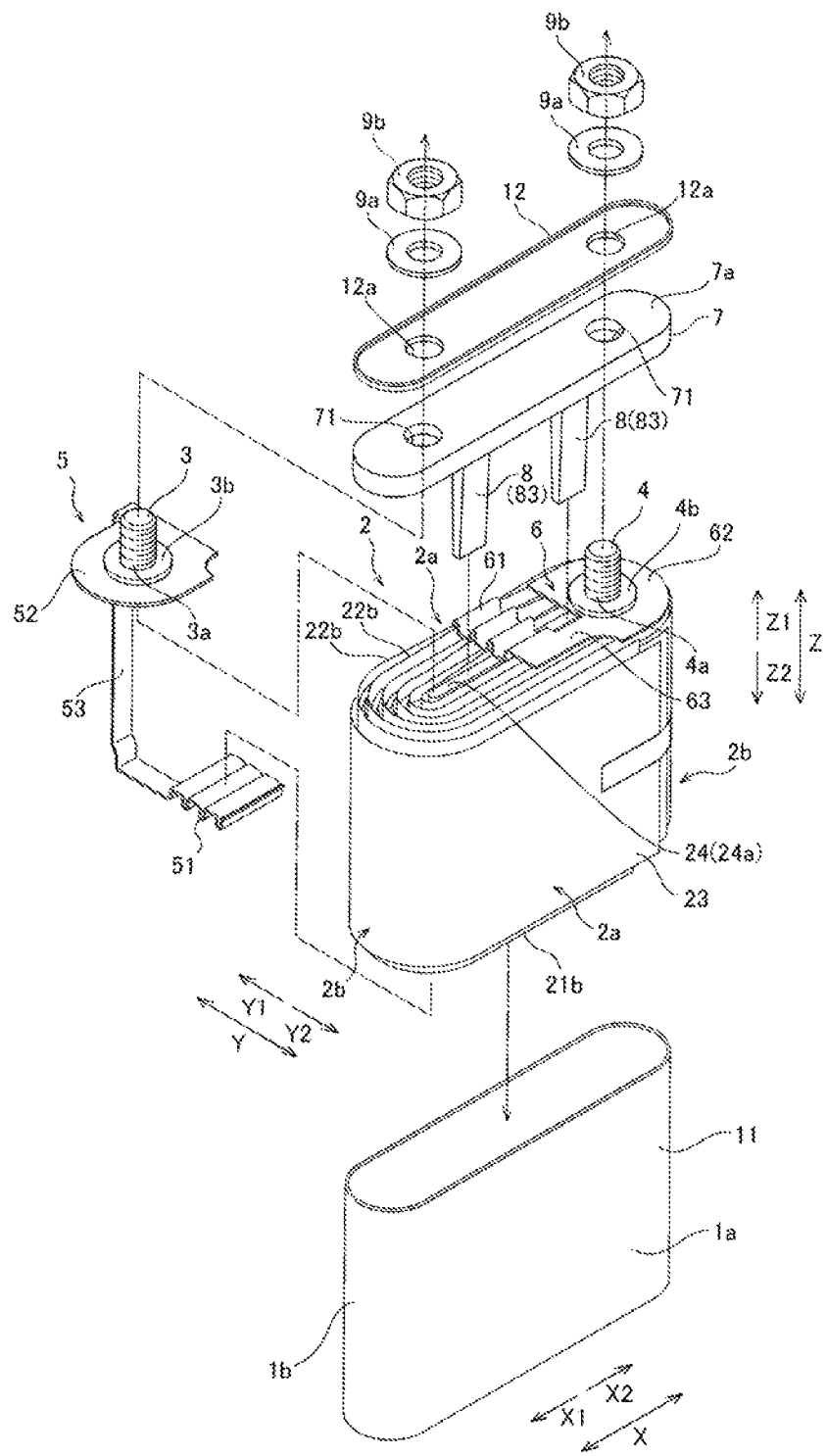
FIG. 2 is an exploded perspective view showing the inside structure of the battery according to the preferred embodiment of the present invention.

The battery 100 according to the present preferred embodiment is an elliptical, cylindrical lithium-ion cell that is one kind of non-aqueous electrolyte battery, as shown in FIG. 1. As shown in FIG. 2, the battery 100 is provided with an electricity-generating element 2 contained inside a case 1. As shown in FIG. 1, a positive electrode terminal 3 and a negative electrode terminal 4 are disposed in the battery 100 in such a manner as to project upward from a cover plate 12 serving as the upper surface of the battery case 1. As shown in FIG. 2, the battery 100 is provided with a positive electrode current collecting terminal 5 for electrically connecting the positive electrode terminal 3 to the electricity-generating element 2 and a negative electrode current collecting terminal 6 for electrically connecting the negative electrode terminal 4 to the electricity-generating element 2. The battery 100 is further provided with an insulating plate 7 for insulating the electricity-generating element 2 from the cover plate 12 of the battery case 1 and spacers 8 for fixing the electricity-generating element 2 inside the battery case 1. The battery 100 is provided with nuts 9b screwed to a screw 3a for the positive electrode terminal 3 and a screw 4a for the negative electrode terminal 4 with washers 9a interposed therebetween, respectively. Incidentally, the insulating plate 7 exemplifies a "member" according to the present invention.

As shown in FIGS. 1 and 2, the battery case 1 includes an elliptical, cylindrical case body 11 having a bottom, side surfaces, and an opening formed at the upper end thereof, and the elliptical disk-like cover plate 12 for sealing the opening formed at the upper end of the case body 11. The battery case 1 includes a pair of flat portions 1a constituting the longitudinal side surfaces and curved portions 1b constituting the lateral side surfaces. As shown in FIG. 2, the cover plate 12 has two terminal holes 12a formed on both sides in a longitudinal direction (i.e., an X direction) so as to allow the positive electrode terminal 3 and the negative electrode terminal 4 to project from the inside the case. Cylindrical insulating members, not shown, are inserted into the terminal holes 12a formed in the cover plate 12, so that the side surfaces of the positive electrode terminal 3 and the negative electrode terminal 4 are insulated from the inner circumferential surfaces of the terminal holes 12a. The cover plate 12 is fixed to the case body 11 by welding or the like in the state in which the terminal holes 12a is fitted to the opening of the case body 11.

Figure 3:
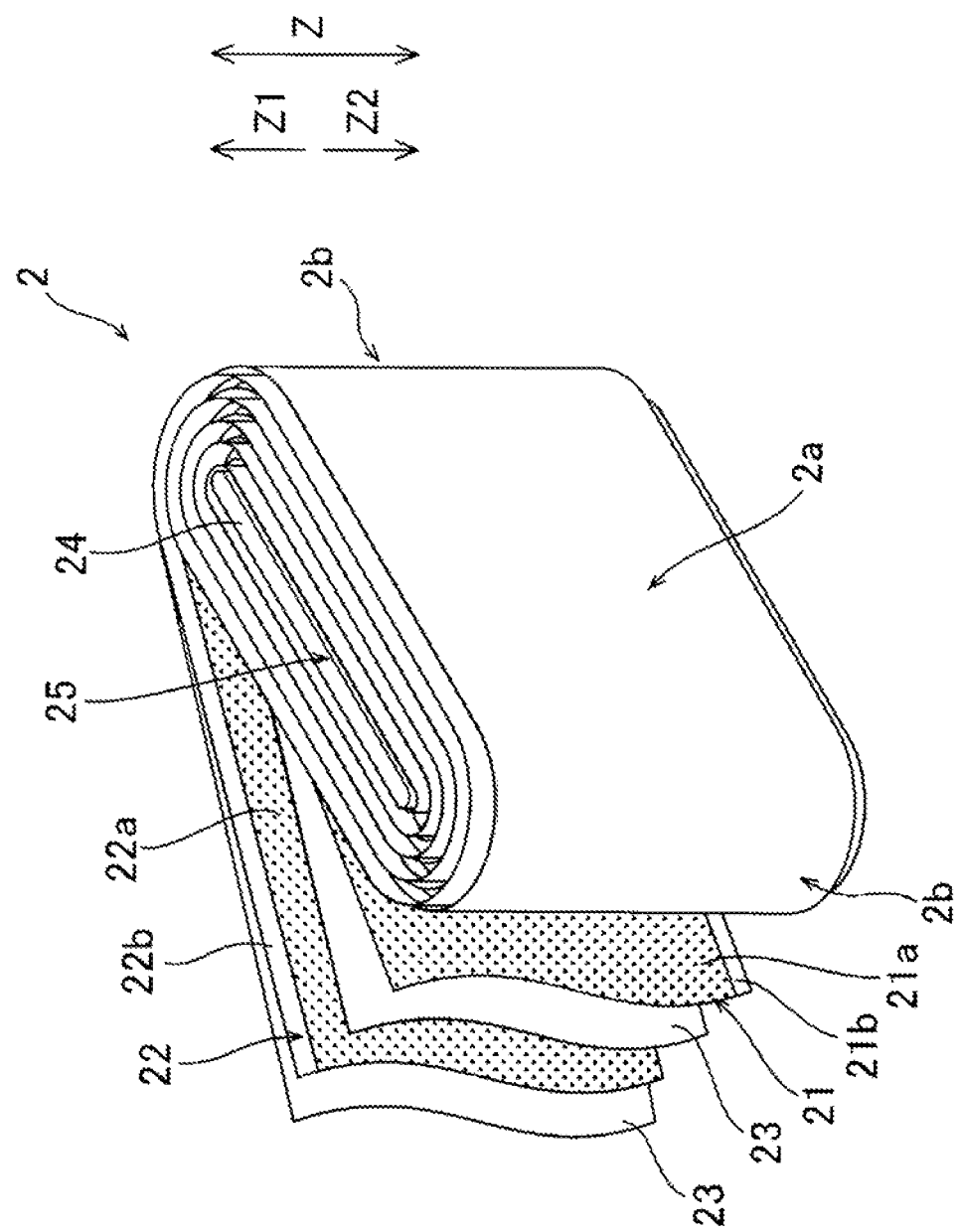
FIG. 3 is a perspective view explanatory of the structure of an electricity-generating element for the battery according to the preferred embodiment of the present invention.
Figure 4:
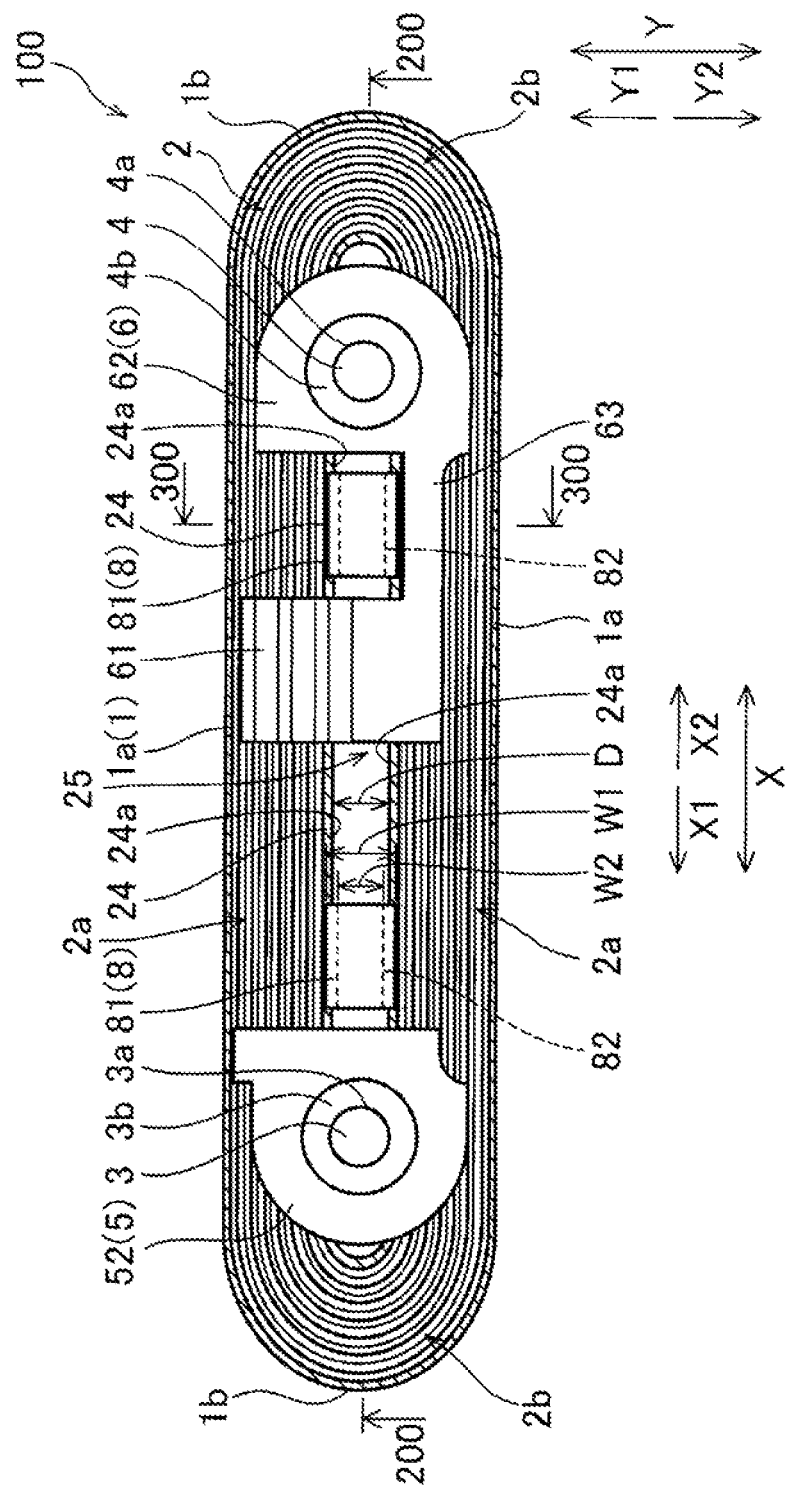
FIG. 4 is an inside plan view for explaining the inside structure of the battery according to one preferred embodiment of the present invention.

As shown in FIG. 3, the electricity-generating element 2 is formed by winding a belt-like positive electrode 21 and a belt-like negative electrode 22 via belt-like separators 23. Specifically, the electricity-generating element 2 is annularly formed by winding the positive electrode 21, the negative electrode 22, and the separators 23 around a cylindrical core 24. In this manner, a winding axial portion 25 (see FIG. 4) that is a space defined inside the core 24 is formed at the center of the annular electricity-generating element 2. The electricity-generating element 2 is contained inside the battery case 1 in the elliptical, cylindrical shape in conformity with the elliptical, cylindrical battery case 1. As shown in FIG. 4, the electricity-generating element 2 is housed inside the battery case 1 in the state in which the electricity-generating element 2 is deformed in such a manner as to include a pair of flat portions (longitudinal side surfaces) 2a and a pair of curved portions (lateral side surfaces) 2b. As a consequence, the winding axial portion 25 at the inner circumference of the electricity-generating element 2 also is formed into an elliptical, cylindrical shape.

As shown in FIG. 3, a mixture 21a including positive electrode active substance, a binder, or the like is applied to a portion other than the lower end of an aluminum foil, surface (i.e., an end in a Z2 direction). In other words, the positive electrode 21 has a belt-like mixture non-formed portion 21b along the longitudinal direction at the lower end of the aluminum foil surface. An aluminum foil is exposed at the mixture non-formed portion 21b.

Moreover, a mixture 22a including negative electrode active substance, a binder, or the like is applied to a portion other than the upper end of a copper foil surface (i.e., an end in a Z1 direction) in the negative electrode 22. In other words, the negative electrode 22 has a belt-like mixture non-formed portion 22b along the longitudinal direction at the upper end of the copper foil surface. A copper foil is exposed at the mixture non-formed portion 22b. In this manner, the mixture non-formed portions 22b and 21b are formed at the upper end and the lower end in the electricity-generating element 2 in the winding axial direction (i.e., a Z direction).

As shown in FIG. 2, the positive electrode current collecting terminal 5 includes a positive electrode joint 51 to be joined to the mixture non-formed portion 21b of the positive electrode 21, a terminal joint 52 to be joined to the positive electrode terminal 3, and a connector 53 for connecting the positive electrode joint 51 and the terminal joint 52 to each other. The positive electrode joint 51 is joined to the mixture non-formed portion 21b of the positive electrode 21 at the lower portion of the electricity-generating element 2. In the meantime, the terminal joint 52 is mounted at the upper end in the winding axial direction of the electricity-generating element 2 (i.e., the end in the Z1 direction). The connector 53 is formed in such a manner as to extend in a vertical direction along the outside surface of the electricity-generating element 2.

The negative electrode current collecting terminal 8 includes a negative electrode joint 61 to be joined to the mixture non-formed portion 22b of the negative electrode 22, a terminal joint 62 to be joined to the negative electrode terminal 4, and a connector 63 for connecting the negative electrode joint 61 and the terminal joint 62 to each other. The negative electrode joint 61 is joined to the mixture non-formed portion 22b of the negative electrode 22 at the upper portion of the electricity-generating element 2. In the meantime, the negative electrode terminal 4 is joined to the terminal joint 62. The connector 68 is formed in such a manner as to extend in the longitudinal direction at the upper end in the winding axial direction of the electricity-generating element 2 (i.e., the end in the Z1 direction).

As shown in FIG. 2, the insulating plate 7 is interposed between the electricity-generating element 2 and the cover plate 12. The insulating plate. 7 is provided for insulating the electricity-generating element 2 and the cover plate 12 from each other. The insulating plate 7 is made of a resin (PPS: polyphenylene sulfide) formed into an elliptical shape in conformity with the shape of the cover plate 12.

Figure 5:
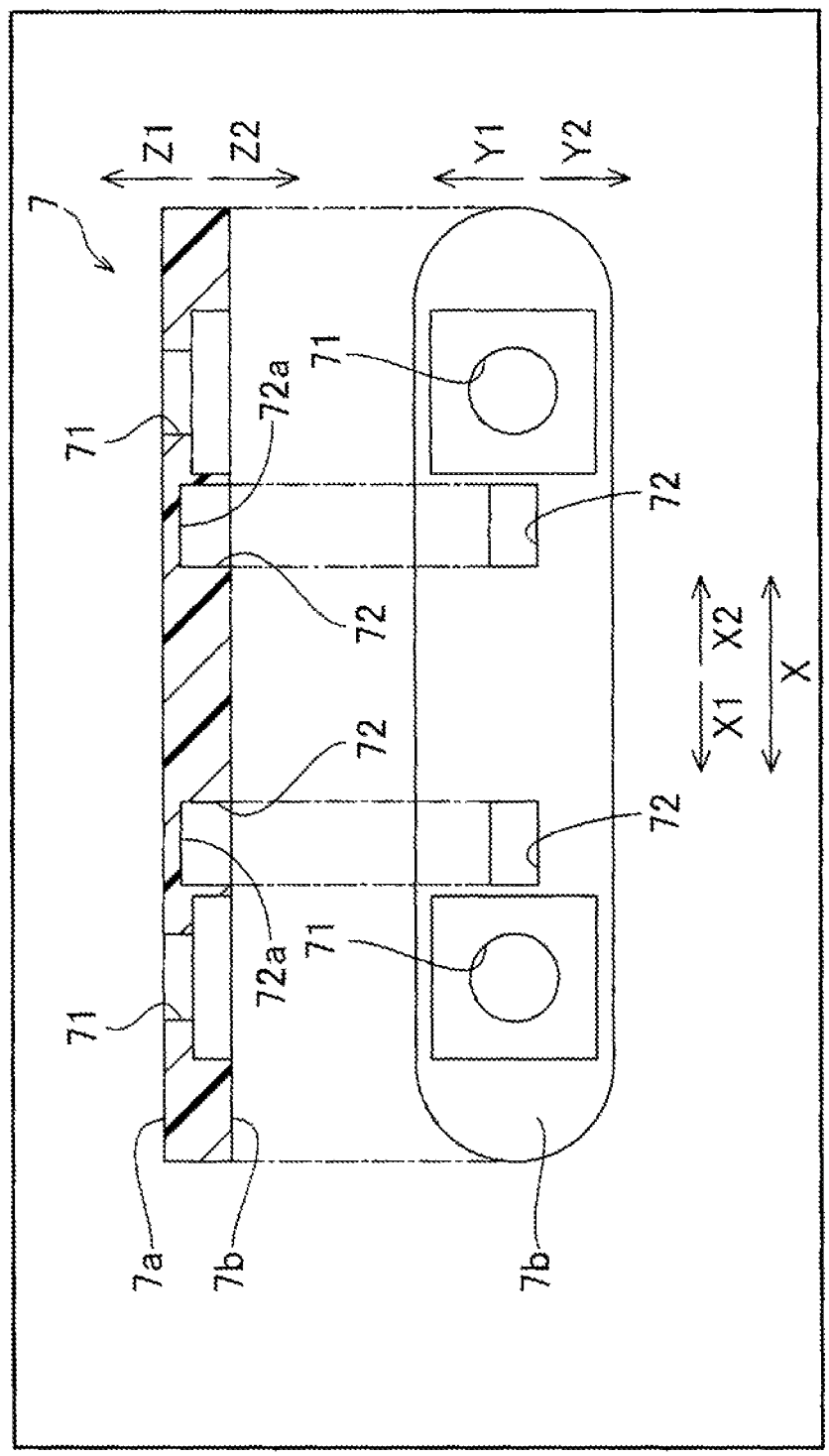
FIG. 5 is a view showing an insulating plate for the battery according to the preferred embodiment of the present invention.

Here, in the present preferred embodiment, the insulating plate 7 includes two spacer fixing portions 72, as illustrated in FIG. 5. The two spacer fixing portions 72 are disposed between two terminals holes 71 and on both sides in the longitudinal direction of the insulating plate 7. Each of the terminals holes 71 and each of the spacer fixing portions 72 are located at the center in the lateral direction (i.e., a Y direction). In the insulating plate 7, the positive electrode terminal 3 and the negative electrode terminal 4 (see FIG. 2) are inserted into the terminal holes 71, respectively, on the side of a lower surface 7b (i.e., in the Z2 direction).

Figure 6:
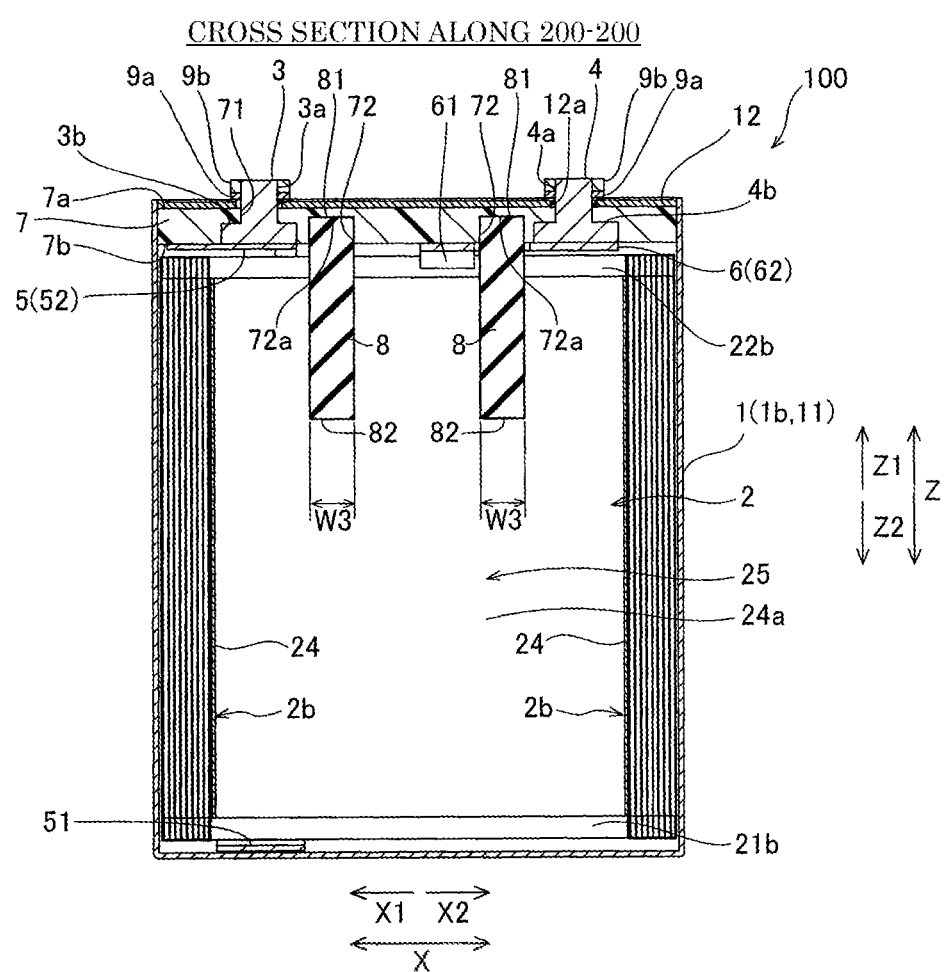
FIG. 6 is a cross-sectional view schematically showing the cross section of the battery, taken along a line 200-200 of FIG. 4.

Moreover, the spacer fixing portion 72 is formed at the lower surface 7b of the insulating plate 7 in the shape of a recess having a rectangular cross section, and further, does not penetrate up to the upper surface 7a of the insulating plate 7. In other words, the spacer fixing portion 72 is a recess having a bottom 72a that can abut against a root 81, described later, of the spacer 8. The insulating plate 7 is fixed to the cover plate 12 in the state in which the upper surface (i.e., a surface in the Z1 direction) 7a abuts against the lower surface of the cover plate 12. Specifically as shown in FIGS. 1 and 6, the positive electrode terminal 3 and the negative electrode terminal 4 that project toward the upper surface of the battery case 1 via the terminal holes 71 of the insulating plate 7 and terminal holes 12a of the cover plate 12 are tightened by the washers 9a and the nuts 9b, respectively. More particularly, the nuts 9b are screwed to the screw 8a of the positive electrode terminal 3 and the screw 4a of the negative electrode terminal 4 with the washers 9a interposed therebetween, respectively. As a consequence, the positive electrode terminal 3 and the negative electrode terminal 4 are fixed to the cover plate 12 with the insulating plate 7 interposed therebetween, and further, the insulating plate 7 is held between respective roots 3b and 4b of the positive electrode terminal 3 and the negative electrode terminal 4 and the cover plate 12, to be thus fixed to the cover plate 12.

The spacer 8 is made of EPDM rubber (ethylene-propylene-diene rubber) having electrolyte resistance. As shown in FIGS. 2 and 6, the roots 81 of the spacers 8 are fitted to the spacer fixing portions 72 (see FIG. 5) of the insulating plate 7, respectively, so that the spacers 8 are secured to the two spacer fixing portions 72, respectively. The root 81 of the spacer 8 is such configured as to abut against the bottom 72a of the spacer fixing portion 72. The spacers 8 are inserted into (i.e., press-fitted to) the winding axial portion (i.e., the space defined at the center) 25 from above in the winding axial direction of the electricity-generating element 2 having the mixture non-formed portion 22b. Additionally as shown in FIG. 4, the two spacers 8 are located inward of the terminal joint 52 of the positive electrode current collecting terminal 5 in the X direction and interposed between the negative electrode joint 61 and the terminal joint 62 of the negative electrode current collecting terminal 6, respectively. Incidentally, each of the spacers 8 is positioned at the center in the Y direction.

Figure 7:
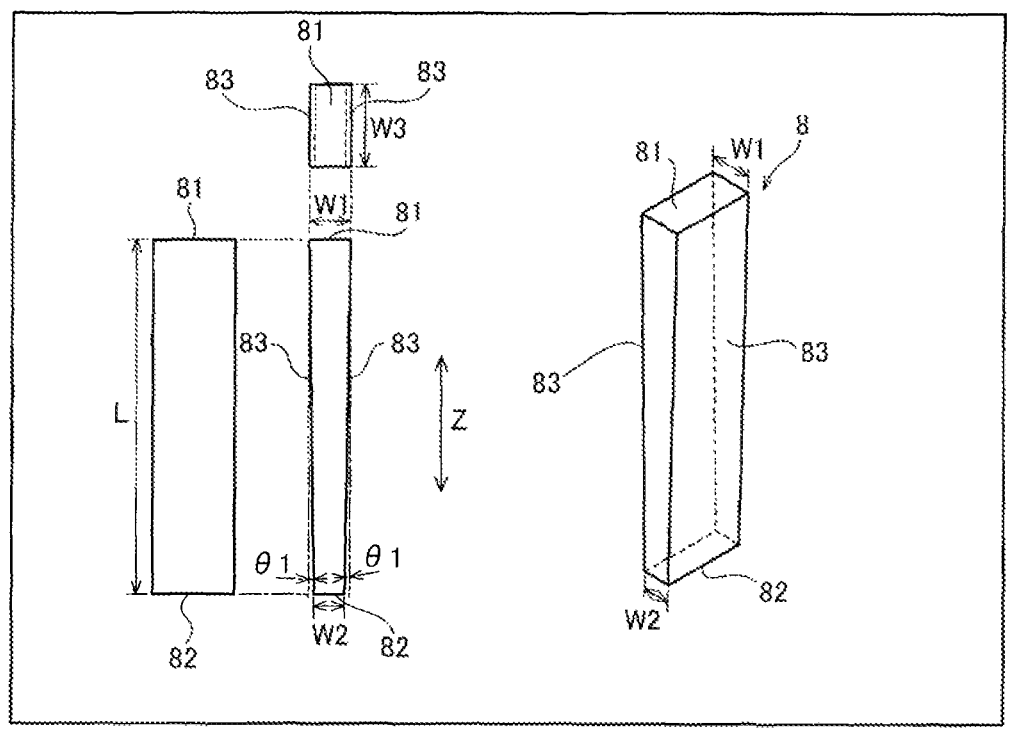
FIG. 7 is a view for explaining the shape of a spacer for the battery according to the preferred embodiment of the present invention.

As shown in FIG. 7, in the present preferred embodiment, the spacer 8 includes the flat, rectangular root 81, a flat, rectangular tip 82, and a pair of inclined portions (i.e., slopes) 83 that are linearly inclined such that a width (i.e., a thickness) on a short side is reduced from the root 81 toward the tip 82 at a predetermined rate. That is to say, the spacer 8 is formed into the shape of a tapered wedge, wherein the width W2 of the tip 82 is smaller than the width W1 of the root 81. Each of the inclined portions 83 has a flat surface. The inclination angles θ1 of the inclined portions 83 are equal to each other. In the present preferred embodiment, the angle θ1 is about 1°. Moreover, the root 81 and the tip 82 of the spacer 8 have the same width W3 on the long side, and further, the spacer 8 has a length L in the Z direction.

Figure 8:
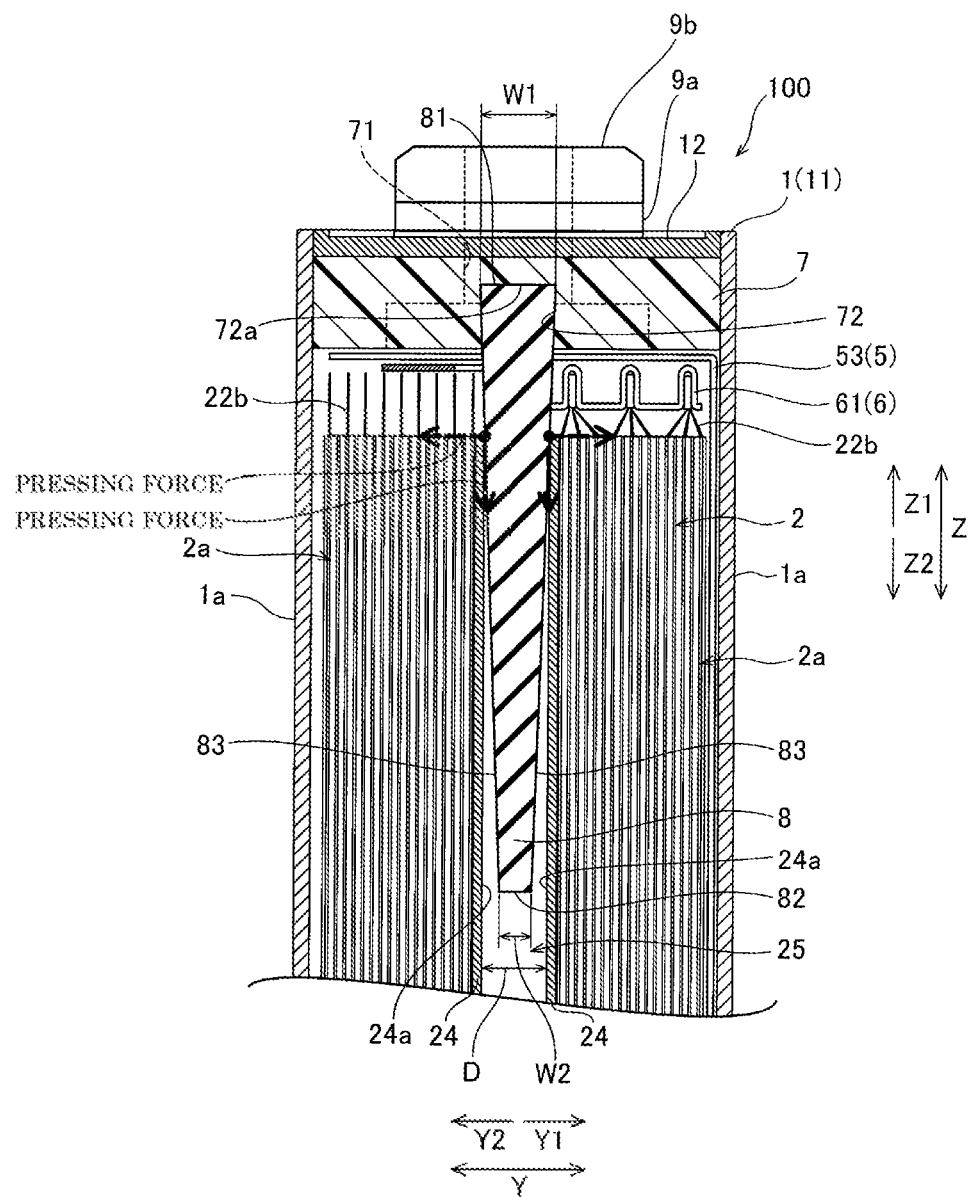
FIG. 8 is an enlarged cross-sectional view schematically showing a cross section, taken along a line 300-300 of FIG. 4.

As shown in FIG. 2, the spacer 8 to be inserted into the winding axial portion 25 of the electricity-generating element 2 is disposed such that the inclined portion 83 having the flat surface extends along a flat inner circumferential surface 24a of the core 24 of the electricity-generating element 2. In other words, as shown in FIG. 8, the spacer 8 is located such that the inclined portion 83 having the flat surface faces the flat inner circumferential surface 24a of the core 24. Here, the width W2 of the tip 82 of the spacer 8 is set to be smaller than a distance D (i.e., a distance between the flat inner circumferential surfaces 24a opposite to each other, of the core 24) in the lateral direction (i.e., the Y direction) of the winding axial portion 25. In the meantime, the width W1 of the root 81 of the spacer 8 is set to be greater than the distance D in the lateral direction of the winding axial portion 25. As a consequence, the spacer 8 is fitted to the winding axial portion 25 near the upper end of the flat inner circumferential surface 24a of the core 24, and then, the pair of inclined portions 83 presses the flat inner circumferential surface 24a of the core 24 from the inside. Since each of inclined portions 83 is inclined at the inclination angle θ1, pressing force applied from the spacer 8 is divided into a divided force downward in the winding axial direction (i.e., the Z2 direction) and a divided force outward in the lateral direction (i.e., the Y direction) at the portion where the inclined portions 83 of the spacer 8 abut against the flat inner circumferential surface 24a of the core 24, thereby acting on the electricity generating element 2. As a consequence, the spacer 8 fixes the electricity-generating element 2 inside the battery case 1, and therefore, has the function of suppressing the lateral movement of the electricity-generating element 2 in the case where a vibration or impact adversely acts on the battery 100. Incidentally, in the present preferred embodiment, since the inclination angle θ1 of the inclined portion 83 of the spacer 8 is less than 45° (θ is about 1°), the divided force (i.e. the pressing force) in the lateral direction is greater than the divided force (i.e., the pressing force) in the winding axial direction.

Incidentally, when the spacer 8 is inserted into the winding axial portion 25 of the electricity-generating element 2, the spacer 8 abuts against the upper end of the inner circumferential surface of the electricity-generating element 2 (i.e., the flat inner circumferential surface 24a of the core 24) at a portion where the width (i.e., the thickness) accords with the distance D of the winding axial portion 25 at the inclined portion 83 between the root 81 having the width W1 and the tip 82 having the width W2. When the cover plate 12 is fitted to the opening of the case body 11, the spacer 8 is press-fitted to the winding axial portion 25, and therefore, the elastic spacer 8 made of the EPDM rubber is elastically deformed while being inserted into the winding axial portion 25 up to the root side (i.e., the side of the root 81) beyond a portion where the thickness accords with the distance D. In this manner, the pair of inclined portions 88 abuts against the upper end of the inner circumferential surface of the electricity-generating element 2 (i.e., the flat inner circumferential, surface 24a of the core 24) so that the spacer 8 presses the electricity-generating element 2 downward in the winding axial direction (i.e., the Z2 direction), and further, presses each of the inner circumferential surfaces in the Y1 and Y2 directions of the electricity-generating element 2 outward in the lateral direction (i.e., the Y direction) so as to spread them.

In the present preferred embodiment, as described above, the spacer 8 having the inclined portion 83 tapered toward the tip 82 is inserted into the winding axial portion 25 of the electricity-generating element 2 on the side of the tip 82, and then, the inclined portion 83 presses the electricity-generating element 2. In this manner, the tapered spacer 8 is inserted into the winding axial portion 25 like the wedge, so that the inclined portion 83 can press the electricity-generating element 2 both toward the winding axial direction (i.e., the Z direction) and the lateral direction, (i.e., the Y direction). Consequently, the pressing force of the inclined portion 83 of the spacer 8 can suppress the lateral movement of the electricity-generating element 2.

Moreover, as described above, the present preferred embodiment is configured such that the battery case 1 containing the electricity-generating element 2 therein is provided, and further, the root 81 opposite to the tip 82 of the spacer 8 inserted into the winding axial portion 25 of the electricity-generating element 2 abuts against the insulating plate 7 fixed to the battery case 1, thus suppressing the spacer 8 from being moved in the winding axial direction. Hence, the electricity-generating element 2 can be suppressed from being moved in the winding axial direction in addition to the suppression of the lateral movement of the electricity-generating element 2.

Additionally, as described above, in the present preferred embodiment, the mixture non-formed portion 22b not having the mixture 22a in the negative electrode is formed at the end in the winding axial direction of the negative electrode 22, and further, the spacer 8 is inserted into the winding axial portion 25 of the electricity-generating element 2 from the end in the winding axial direction where the mixture non-formed portion 22b is disposed, and then, the inclined portion 83 presses the electricity-generating element 2. Thus, it is possible to suppress the movement of the electricity-generating element 2. In other words, the mixture non-formed portion 22b of the electricity-generating element 2 is made of only the copper foil, and therefore, has a greater flexibility than that of the portion applied with the mixture 22a. As a consequence, in the case where the mixture non-formed portion 22b is pressed in the winding axial direction so that the electricity-generating element 2 is fixed, the mixture non-formed portion 22b per se is liable to be deformed, and therefore, the electricity-generating element 2 cannot be sufficiently fixed. In contrast, like the present preferred embodiment, the spacer 8 is inserted into the winding axial portion 25 of the electricity-generating element 2 so as to press the inner circumferential surface of the mixture forming layer of the electricity-generating element 2. Consequently, it is possible to securely suppress the movement of the electricity-generating element 2 without pressing the mixture non-formed portion 22b of the electricity-generating element 2.

In addition, in the present preferred embodiment, as described above, the inclined portion 83 of the spacer 8 presses the flat inner circumferential surface 24a of the core 24 in the electricity-generating element 2 from inside to outside, and thus, can press the flat inner circumferential surface 24a at a greater contact area. Moreover, like the present preferred embodiment, when the electricity-generating element 2 is formed into the elliptical, cylindrical shape having the curved portion 2b and the flat portion 2a, the flat portion 2a of the electricity-generating element 2 can readily apply the pressure for pressing the electricity-generating element 2 from inside to outside of the electricity-generating element 2 in comparison with the curved portion 2b. Thus, the configuration in which the flat inner circumferential surface 24a of the electricity-generating element 2 is pressed is effective particularly in suppressing the movement of the electricity-generating element 2 inside the battery case 1 because of the close contact of the electricity-generating element 2 with the battery case 1.

(First Modification)

Figure 9:
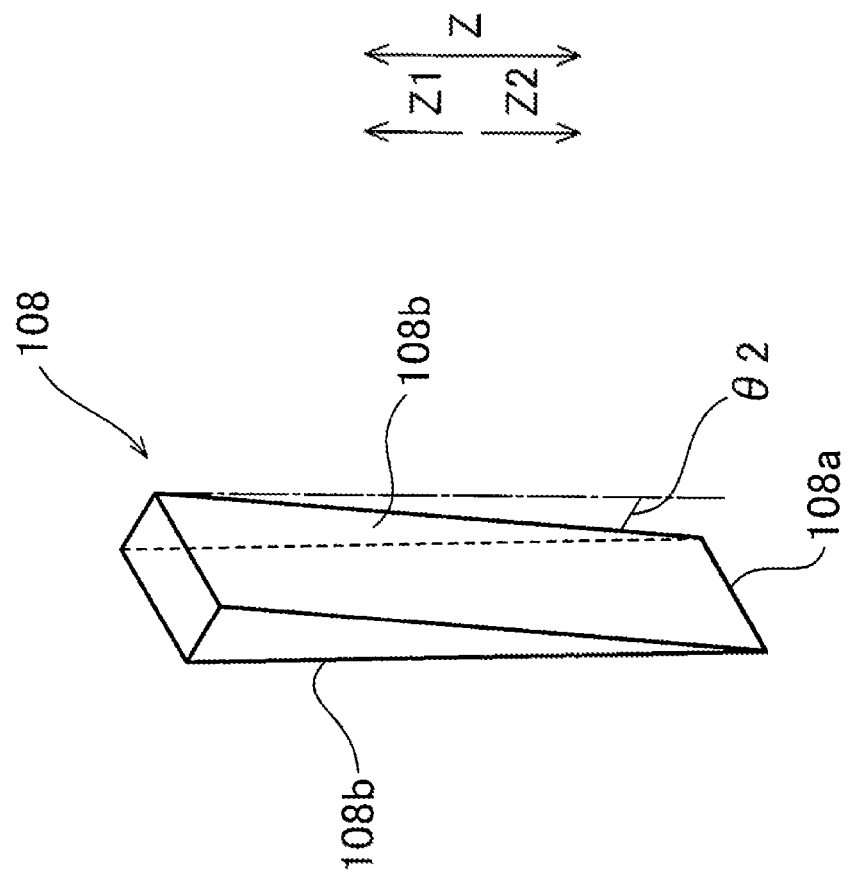
FIG. 9 is a perspective view showing a spacer according to a first modification of the battery according to the preferred embodiment of the present invention.

Although the tip 82 of the spacer 8 is formed into a flat shape and the spacer 8 is formed in a trapezoidal cross section in the above-described preferred embodiment, the cross section of a spacer may be triangle, like a first modification shown in FIG. 9. In the present first modification, a spacer 108 is formed in such a manner as to have a triangular cross section having an acute tip 108a.

In the spacer 108 in the first modification, an inclination angle θ2 (θ2<45°) of an inclined portion 108b is greater than the inclination angle θ1 (θ1=about 1°) of the spacer 8 in the above-described preferred embodiment. In comparison with the spacer 8 in the above-described preferred embodiment, pressing force to the electricity-generating element 2 in the winding axial direction (i.e., the Z2 direction) becomes greater by an increase in the inclination angle θ2 of the inclined portion 108*b*. In other words, the adjustment of the inclination angle θ2 of the inclined portion 108*b* can lead to the adjustment of a ratio of the pressing force applied to the electricity-generating element 2 in the winding axial direction to the pressing force in the lateral direction (i.e., the Y direction). From the viewpoint of the effective fixture of the electricity-generating element 2 by the lateral pressing force exerted on the inner circumferential portion of the electricity-generating element 2, the inclination angle of the spacer 8 (or the spacer 108) should be preferably 45° or less, and more preferably, 15° or less.

(Second Modification)

Figure 10:
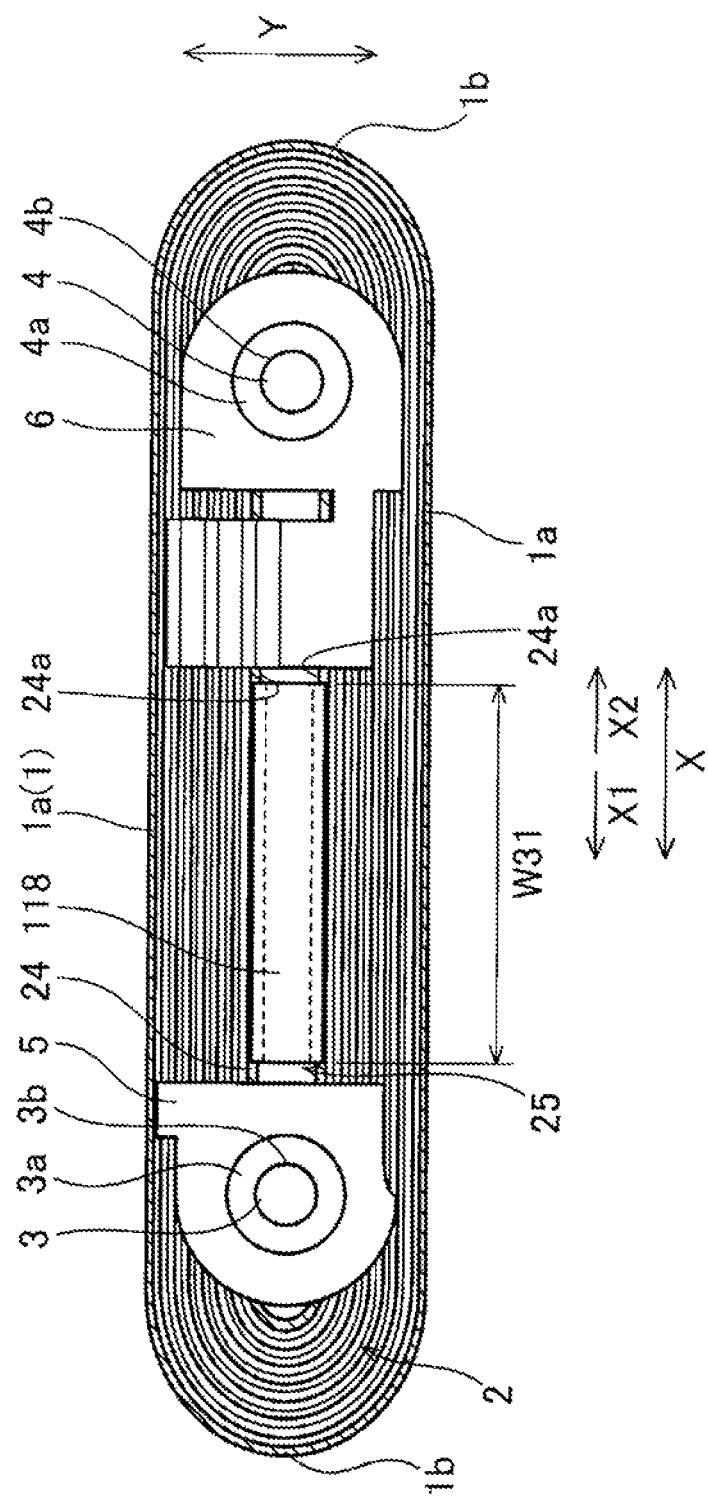
FIG. 10 is a plan view for explaining a spacer according to a second modification of the battery according to the preferred embodiment of the present invention.

Although the description has been given of the above-described preferred embodiment in which the two spacers 8 are arranged on both sides in the longitudinal, direction (i.e., the X direction) of the electricity-generating element 2, a single wide spacer 118 may be arranged like in a second modification shown in FIG. 10.

As shown in FIG. 10, the spacer 118 is formed into a wedge-like shape (a tapered shape) having a great width W31 in the X direction along the flat portion 1*a* of the battery case 1 in the present second modification. The wide spacer 118 is inserted into the winding axial portion 25 at the longitudinal center of the electricity-generating element 2. In this manner, the electricity-generating element 2 can be pressed toward the flat portion 1*a* within a greater range in the longitudinal direction (i.e., the X direction) of the electricity-generating element 2 in the second modification. Consequently, it is possible to reduce the number of component parts in comparison with the first preferred embodiment in which the two spacers 8 are used.

Incidentally, the single spacer 118 may be provided or three or more spacers may be provided according to the present invention, like the present second modification.

(Third Modification)

Figure 11:
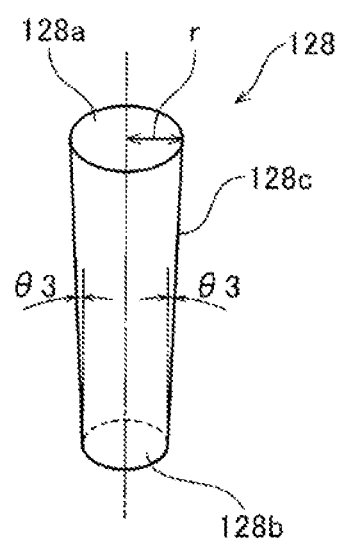
FIG. 11 is a perspective view showing a spacer according to a third modification of the battery according to the preferred embodiment of the present invention.

Although the present invention has been applied to the elliptical, cylindrical battery 100 in the above-described preferred embodiment, it is not limited to this. The present invention may be applied to a cylindrical battery, like a third modification, described later. Specifically, in the case where the present invention is applied to a cylindrical battery, there is provided a truncated, conical spacer 128 having a root 128*a* formed into a flat circle, a flat circular tip 128*b* smaller than the root 128*a*, and an inclined portion 128*c* inclined at an inclination angle θ3 (θ3<45°) where a radial width r is gradually reduced from the root 128*a* toward the tip 128*b*, like in the third modification as shown in FIG. 11.

In the cylindrical battery, a winding axial portion at the center of an electricity-generating element becomes cylindrical. Therefore, the spacer 128 in the third modification is inserted into the winding axial portion of the cylindrical electricity-generating element on the tip side, thus suppressing both of movement in the winding axial direction of the electricity-generating element and movement in a radial direction.

(Fourth Modification)

Although the spacer 8 has been adapted to press the inner circumferential surface 24*a* of the core 24 of the electricity-generating element 2 in the above-described preferred embodiment, the present invention is not limited to this. The spacer 8 may be configured to directly press an inside surface (i.e., an inner circumferential surface) of an electricity-generating element without a core interposed therebetween, like a fourth modification, described later.

Figure 12:
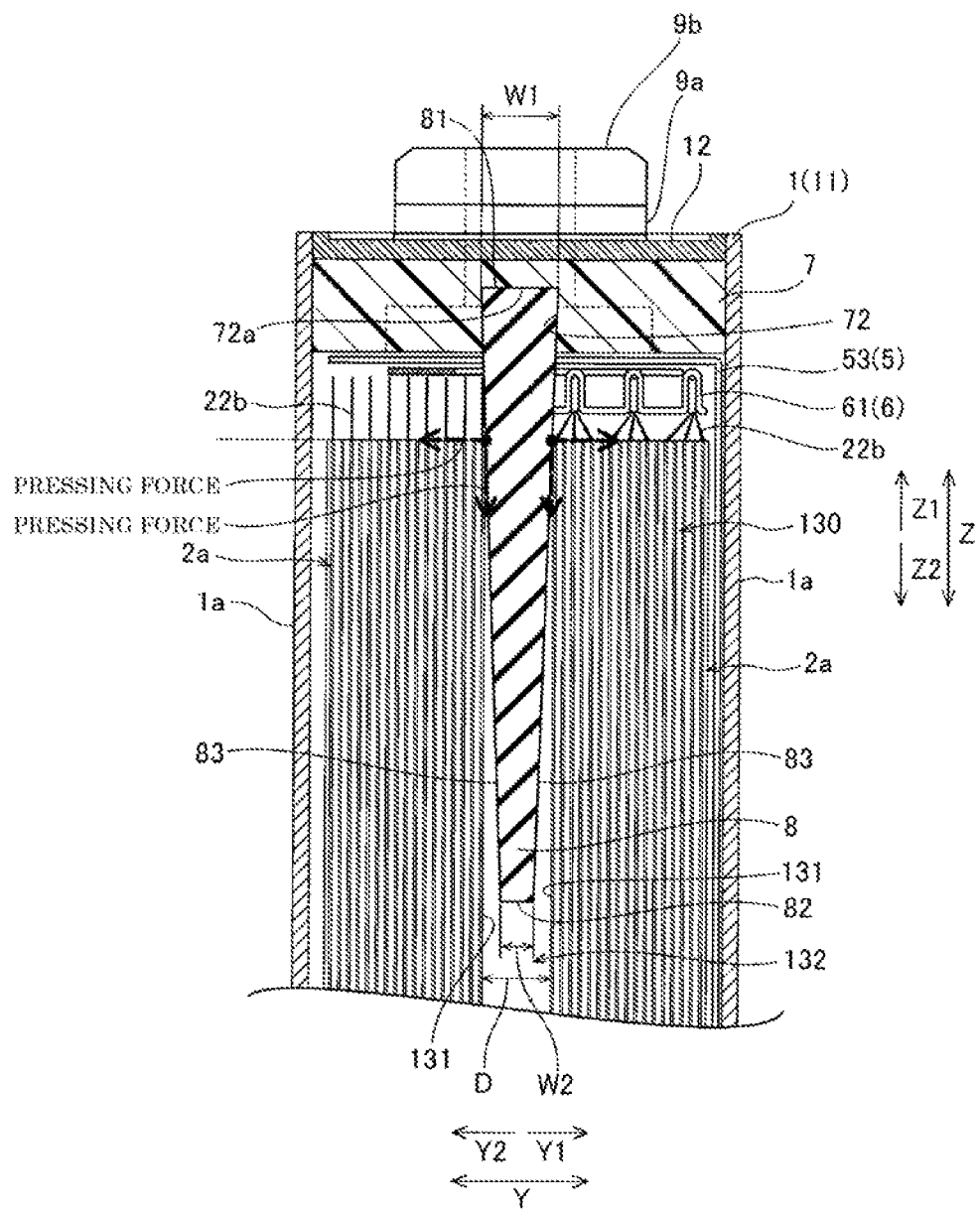
FIG. 12 is an enlarged cross-sectional view showing a fourth modification of the battery according to the preferred embodiment of the present invention.

As shown in FIG. 12, an electricity-generating element 130 in the fourth modification has no core at the inner circumferential surface, unlike the electricity-generating element 2 in the above-described preferred embodiment. Consequently, the inner surface of a laminate consisting of a positive electrode 21, a negative electrode 22, and a separator 23 is exposed to the inside at the center of the annular electricity-generating element 130 in the fourth modification.

In the fourth modification, a spacer 8 is fitted into a winding axial portion 132 at the upper end of an inner circumferential surface 131 of the electricity-generating element 130. At this time, a pair of inclined portions 83 is adapted to press the flat inner circumferential surface 131 of the electricity-generating element 130 from the inside. In other words, the pair of inclined portions 83 consisting of the flat surfaces of the spacer 8 is configured to directly press the flat inner circumferential surface 131 of the electricity-generating element 130 without a core not interposed therebetween, in the fourth modification. With this configuration, the spacer 8 can directly press the electricity-generating element 130 from the inside, so that the pressing force of the inclined portions 83 of the spacer 8 can suppress movement in both of the winding axial direction and lateral direction of the electricity-generating element 130.

Incidentally, it should be construed that the preferred embodiment and modifications described herein are illustrative at all points but are not restrictive. The scope of the present invention should be decided based on not the above-described preferred embodiment and modifications but claims, and further, should encompass all alterations within the significance and scope equivalent to the claims.

For example, the present invention has been applied to the elliptical, cylindrical battery in the above-described preferred embodiment, and further, the present invention has been applied to the cylindrical battery in the third modification. However, the present invention is not limited to these. That is to say, the present invention may be applied to a battery formed into a shape other than the elliptic cylinder and the cylinder, for example, a battery formed into a square.

Moreover, although the root of the spacer is fitted to the spacer fixing hole formed in the insulating plate in the above-described preferred embodiment, the present invention is not limited to this. According to the present invention, a spacer is not fixed to an insulating plate, but a root of a spacer may be allowed to abut against a cover plate constituting a battery case so as to fix the spacer. Alternatively, not the insulating plate but a special fixing member for fixing a spacer may be fixed to a cover plate, so that the root of the spacer may abut against the fixing member.

Additionally, although the mixture non-formed portions for the positive electrode and the negative electrode have been formed at the ends in the winding axial direction of the electricity-generating element, respectively, in the above-described preferred embodiment, the present invention is not limited to this. According to the present invention, no mixture non-formed portion may be formed at the end in the winding axial direction. For example, mixture non-formed portions may be formed at circumferential ends of the positive electrode and the negative electrode.

Furthermore, although the spacer has been made of the EPDM rubber in the above-described preferred embodiment, the present invention is not limited to this. According to the present invention, a spacer may be made of rubber other than the EPDM rubber or a resin material. Here, in consideration of the influence by an electrolyte filled in the battery case, the spacer should be preferably made of material having electrolyte resistance.

In addition, according to the present invention, the shape of the spacer is not limited to the shapes shown in the above-described preferred embodiment and modifications. The shape and dimension of the spacer, the inclination angle of the inclined portion, and the like may be appropriately determined according to the dimension of the battery per se, the position and size of the electricity-generating element, and the like.

Moreover, although the spacer has had the flat inclined portion in the above-described preferred embodiment, the present invention is not limited to this. With the configuration in the above-described preferred embodiment, the inclined portion of the spacer may be formed into a curve.

Furthermore, although the spacer has had the flat root in the above-described preferred embodiment and first to fourth modifications, the present invention is not limited to this. According to the present invention, the root of the spacer may be formed into a curved shape other than the flat shape. In the same manner, although the spacer has had the flat tip in the above-described preferred embodiment and second and fourth modifications, the present invention is not limited to this. According to the present invention, the tip of the spacer may be formed into a curved shape other than the flat shape.

Additionally, according to the present invention, the arrangement and position of the spacer may be appropriately changed. The spacer may be arranged at a position where the positive and negative electrode terminals or the current collecting terminals do not interfere with each other according to their layouts.

In addition, although the spacer has been inserted into the winding axial portion from above in the winding axial direction in the above-described preferred embodiment, the present invention is not limited to this. According to the present invention, the spacer may be inserted into the winding axial portion of the electricity-generating element from both above and below in the winding axial direction or only from below.

Moreover, although the battery according to the present invention has been applied to the lithium-ion cell that is one kind of non-aqueous electrolytic battery in the above-described preferred embodiment, the present invention is not limited to this. The battery according to the present invention may be applied to, for example, a nickel metal hydride battery that, is one kind of aqueous electrolytic battery or a non-aqueous electrolytic battery other than the lithium-ion cell.

DESCRIPTION OF REFERENCE SIGNS 1 battery case
2, 130 electricity-generating element
7 insulating plate (member)
8, 108, 118, 128 spacer
21 positive electrode (electrode plate)
21a, 22a mixture
21b, 22b mixture non-formed portion
22 negative electrode (electrode plate)
23 separator
24 core
24a, 131 (flat) inner circumferential portion
25, 132 winding axial portion
83, 108b, 128c inclined portion
100 battery

The invention claimed is:

1. A battery comprising:
a case and a cover plate that covers the case;
an electricity-generating element that is formed by winding an electrode plate and a separator and has a space at a winding axial portion, the electricity-generating element being in the case; and
a spacer having an inclined portion having a width that is gradually reduced toward the center of the electricity-generating element;
wherein at least a part of the spacer is disposed in the space at the winding axial portion of the electricity-generating element, the inclined portion of the spacer abutting against an end of an inner wall of the electricity-generating element;
the electricity-generating element has a flat surface on the inner wall of the winding axial portion;
the inclined portion of the spacer has a flat surface;
the flat surface of the inclined portion abuts against the flat surface on the inner wall of the winding axial portion;
an end of the spacer has a width that is smaller than a width of other end of the spacer; and
the end of the spacer is disposed in the space at the winding axial portion of the electricity-generating element and the other end of the spacer is in direct contact with the cover plate or an insulating plate that is in direct contact with the cover plate.

2. The battery according to claim 1, wherein the inclined portion of the spacer is configured in such a manner as to press the end of the inner wall of the electricity-generating element.

3. The battery according to claim 1, wherein the electrode plate includes a mixture formed portion at which a mixture for a positive electrode or a negative electrode is formed, and a mixture non-formed portion not having the mixture formed thereat, the electricity-generating element having the mixture non-formed portion at the end in the winding axial direction, and
the inclined portion of the spacer abuts against the mixture formed portion in the electricity-generating element.

4. A fabricating method for a battery,
the battery including:
a case and a cover plate that covers the case,
an electricity-generating element that is formed by winding an electrode plate and a separator and has a space at a winding axial portion, the electricity-generating element being in the case, and
a spacer having an inclined portion having a width that is gradually reduced toward an end,
the fabricating method comprising the steps of:
inserting the spacer into the space at the winding axial portion in the electricity-generating element from the tip of the spacer; and
arranging the inclined portion and an end on an inner wall of the electricity-generating element in such a manner as to allow them to abut against each other,
wherein the electricity-generating element has a flat surface on the inner wall of the winding axial portion;
the inclined portion of the spacer has a flat surface;
the flat surface of the inclined portion abuts against the flat surface on the inner wall of the winding axial portion;
an end of the spacer has a width that is smaller than a width of other end of the spacer; and
the end of the spacer is disposed in the space at the winding axial portion of the electricity-generating element and the other end of the spacer is in direct contact with a cover plate or an insulating plate that is in direct contact with the cover plate.

5. A battery comprising:
a case and a cover plate comprising an insulating plate;

an electricity-generating element in the case, the electricity-generating element comprising a wound electrode plate and a wound separator and having an inner wall surrounding a space at a winding axial portion, the inner wall of the electricity-generating element having a flat portion; and two spacers, one end of each of the two spacers being disposed in the space at the winding axial portion, other end of each of the two spacers being in direct contact with the cover plate or the insulating plate that is in direct contact with the cover plate, the one end of each of the two spacers having a width that is smaller than a width of the other end of each of the two the spacers, each of the two spacers having an inclined flat portion having a width that is gradually reduced toward a center of the electricity-generating element, a portion of the inclined flat portion of the spacer being in parallel with a portion of the flat portion of the inner wall.

* * * * *